United States Patent [19]

Petry

[11] 4,192,227

[45] Mar. 11, 1980

[54] BEVERAGE BREWER

[75] Inventor: Stanton H. Petry, Arlington Heights, Ill.

[73] Assignee: Cory Food Services, Inc., Chicago, Ill.

[21] Appl. No.: 971,054

[22] Filed: Dec. 19, 1978

[51] Int. Cl.² .............................................. A47J 31/54
[52] U.S. Cl. ...................................... 99/279; 99/288; 99/300
[58] Field of Search .................. 99/288, 290, 295, 304, 99/306, 300, 401, 447, 279; 137/377; 141/339; 219/273

[56] References Cited

U.S. PATENT DOCUMENTS

| | | | |
|---|---|---|---|
| 940,611 | 11/1909 | Papish | 141/339 |
| 3,336,856 | 8/1967 | Martin | 99/288 |
| 3,693,535 | 9/1972 | Abel | 99/288 |
| 3,771,432 | 11/1973 | Karlen | 99/304 |

Primary Examiner—Robert W. Jenkins
Attorney, Agent, or Firm—Wegner, Stellman, McCord, Wiles & Wood

[57] ABSTRACT

A beverage brewer structure wherein a pour-in basin is provided with an overlying wall member for preventing liquid which may inadvertently pass downwardly through the top wall of the brewer housing from falling into the basin so as to avoid contamination of the water to be used in the brewing operation. The housing may include a top wall having an opening in which is mounted a warming station and the protective structure is arranged to prevent water or liquid from passing downwardly from the warming station opening into the basin. The wall member may be inclined toward an edge portion of the basin so as to cause the undesirable liquid to flow away from the basin. The wall member may be suitably heated as by heat transfer association with the water heating tank of the beverage brewer so as to cause evaporation of the undesirable liquid which may fall thereonto. The wall member may further serve as an antisplash device for preventing splashing of the poured-in-water outwardly through the portion of the basin underlying the wall member. A delivery conduit may be provided for delivering water to the basin from a pressurized water supply. The delivery conduit may extend through a suitable opening in the wall member which thus serves to retain the conduit end portion in proper relationship to the basin. The wall member may include securing portions arranged to secure the wall member to the basin and the basin to an upstanding support on a shelf portion of the housing. The shelf portion may be reinforced by brackets which may be secured to the upper end of a rear upstanding portion of the housing. The basin support, in turn, may be secured to the brackets. The basin and upstanding support therefor may have interlocking portions for accurately locating the basin in a preselected overlying relationship to the hot water tank.

22 Claims, 6 Drawing Figures

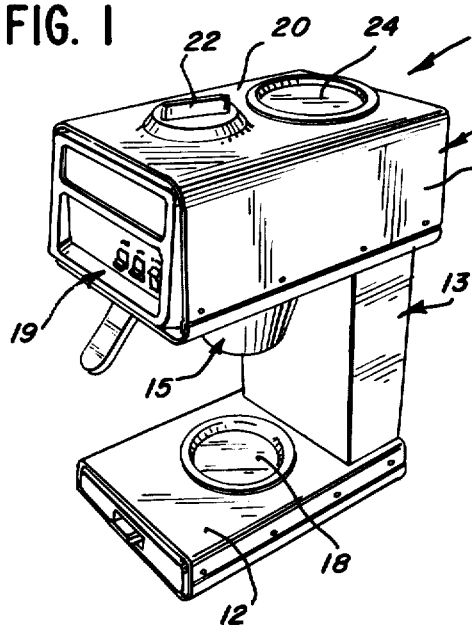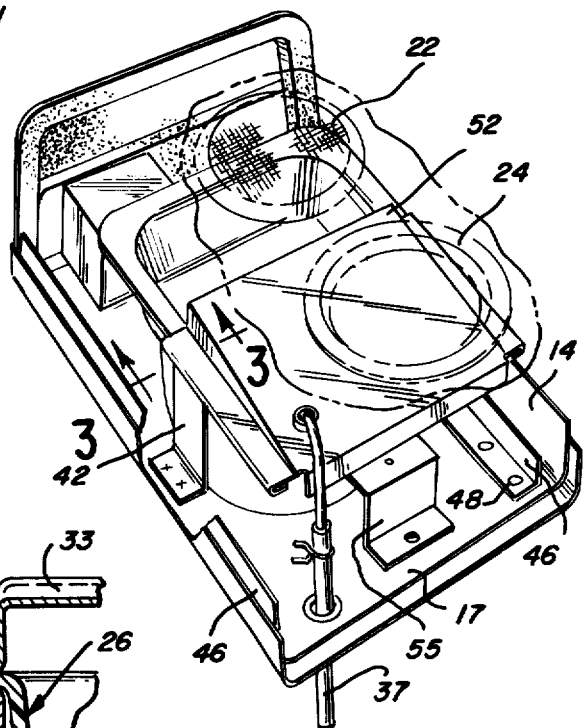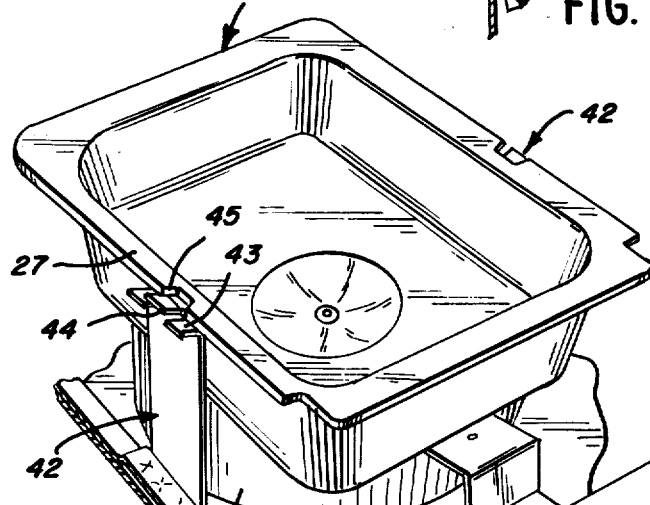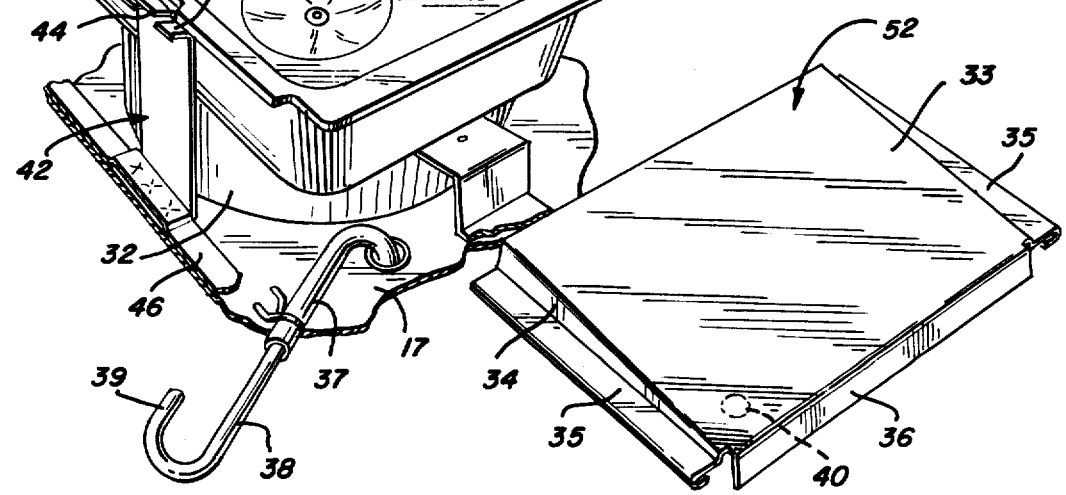

BEVERAGE BREWER

BACKGROUND OF THE INVENTION

1. Field of the Invention

This invention relates to beverage brewer structures and in particular to means for mounting and protecting the basin of a pour-in brewer beverage structure in the normal use thereof.

2. Description of the Prior Art

In one form of beverage brewer, a basin is provided within a housing for receiving water to be heated in an associated hot water heating tank. The top wall of the housing is conventionally provided with an opening through which the poured-in water may be delivered into a portion of the basin.

It is also conventional in certain prior art beverage brewer structures to provide a warmer station on the upper wall of the beverage brewer to receive a decanter, or similar receptacle, and maintain the coffee or other beverage in the decanter at serving temperature. For this purpose, the top wall is provided with an opening and the warmer station structure is mounted to extend across the opening with portions thereof depending into the space in the cabinet below the top wall.

It has further been conventional to mount the basin on the housing as by corner support means.

In one improved form of beverage brewer structure, the water heating means comprises an instantanteous-type heater wherein the cold water is heated as it flows through a body of heated metal. It has been conventional to mount the instantaneous-type water heater on a shelf portion of the housing. The shelf portion has been cantilevered forwardly from a rear upright of the housing so as to overlie the space in which the brewing cartridge and receiving decanter are disposed during the brewing operation.

One example of a beverage brewer structure utilizing such a cantilevered upper portion having a basin for receiving brewing water is shown in U.S. Pat. No. 3,387,903 of Harvey R. Karlen, which patent is owned by the assignee hereof. In this patent, the basin extends upwardly through the top wall of the top portion of the cabinet.

In U.S. Pat. No. 3,589,273 of Harvey R. Karlen, which patent is also owned by the assignee hereof, the basin is disposed within the upper portion of the outer housing for delivering the poured-in water to a subjacent heating tank in an upright rear support portion of the housing. The basin includes a removable lid having an inlet opening in one portion thereof.

SUMMARY OF THE INVENTION

The present invention comprehends an improved beverage brewer structure wherein a basin is mounted in an upper portion of an outer housing for receiving poured-in water from a decanter or the like through an opening in the top wall of the housing. The top wall may further support a warmer station which may extend across an opening in the upper wall overlying a portion of the basin within the housing.

The invention comprehends providing means for preventing liquid which might inadvertently pass downwardly through the warmer station opening from falling into the basin and thereby contaminating the brewing water.

In the illustrated embodiment, this means comprises a wall member which is mounted to the basin to overlie the portion thereof underlying the warmer station opening.

The wall member may be inclined so as to deflect the liquid which may fall from the warmer station opening to an edge of the basin. Further, the wall member may be sufficiently heated as by heat transfer association with the water heating means in the brewing apparatus so as to evaporate water which may fall downwardly through the warmer station opening thereonto.

The wall member may be secured to the basin by cooperating embracing edge portions thereof. The basin may be supported on upstanding supports which may be carried on brackets associated with a shelf portion of the housing defining the bottom of the cantilevered upper portion thereof. The supports and basin edge portions may be provided with locating means for accurately locating the basin relative to the underlying water heating device.

In the illustrated embodiment, the water heating device may comprise an instantaneous-type heater which receives the water from the basin and which heats the water as it passes therethrough to the subjacent brewing cartridge.

The shelf brackets may be secured at their rear end to the upper end of the rear upstanding portion of the housing so as to reinforce the shelf in defining the bottom of the forwardly cantilevered upper portion of the housing.

The beverage brewing structure may further include a conduit for delivering pressurized water to the basin alternatively to the pouring in of the water thereinto in effecting the desired brewing operation. The invention comprehends the provision in the overlying wall member of an opening for passing the end of the delivery conduit downwardly therethrough to deliver the pressurized water to the basin in the portion underlying the wall member. The wall member further defines means for preventing splashing of water upwardly from the basin either from the poured-in water or from the pressurized delivered water, from that portion of the basin underlying the wall member.

Thus, the invention comprehends an improved beverage brewer which is extremely simple and economical of construction while yet providing the highly desirable features discussed above in a novel and simple manner.

BRIEF DESCRIPTION OF THE DRAWING

Other features and advantages of the invention will be apparent from the following description taken in connection with the accompanying drawing wherein:

FIG. 1 is a perspective view of a beverage brewer structure embodying the invention;

FIG. 2 is a fragmentary isometric view of a portion of the structure, with a portion of the outer housing shown in broken lines;

FIG. 3 is a fragmentary enlarged vertical section taken substantially along the line 3—3 of FIG. 2;

FIG. 4 is a fragmentary perspective view illustrating one step in the assembly of the brewer structure of the invention;

DESCRIPTION OF THE PREFERRED EMBODIMENT

Figure 5:
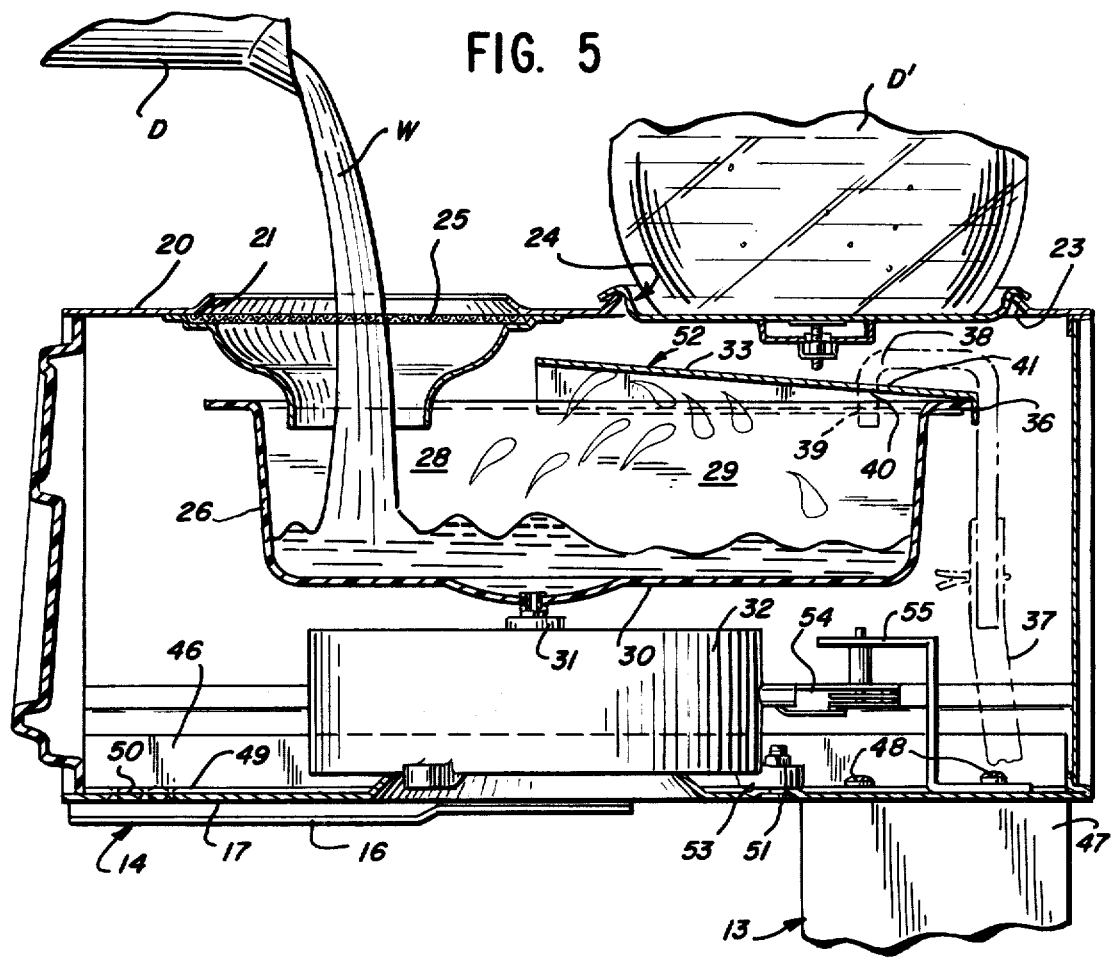
FIG. 5 is a fragmentary, fore-and-aft, vertical section of the beverage brewer structure.

In the exemplary embodiment of the invention as disclosed in the drawing, a beverage brewer structure generally designated 10 is shown to comprise illustratively a coffee brewer provided with an outer cabinet 11 including a base portion 12, an upstanding rear support portion 13, and a cantilevered head portion 14. A removable brewing cartridge generally designated 15 may be selectively supported on a slide carrier 16 provided on a lower shelf 17 of the head portion 14. The base may be provided with a warmer station 18 for carrying a decanter or the like to receive the brewed coffee from cartridge 15 and to maintain it at brewing temperature. Suitable electrical control switches 19 may be provided for controlling the operation of the beverage brewer.

The head portion 14 of cabinet 11 defines a top wall 20. A forward portion of the top wall defines an inlet opening 21 which may be selectively closed by a removable lid 22. The top wall further defines a second opening 23 in a rear portion thereof in which is mounted a second warmer station 24. As shown in FIG. 5, the warmer station 24 extends substantially across the opening 23. As further shown in FIG. 5, the pouring opening 21 is provided with a filter screen 25 for screening out material in the brewing water delivered therethrough to a subjacent basin 26 within the head portion 14 of the brewer.

Basin 26 comprises an upwardly open basin having a peripheral flange portion 27. The basin defines a first, forward portion 28 underlying the pour-in opening 21, and a second, rearward portion 29 underlying the warmer station opening 23. The basin further defines a bottom wall 30 having a connector 31 connecting the basin to a subjacent water heating device 32 which may comprise a conventional instantaneous water heater adapted to heat the coffee brewing water as it flows therethrough to the subjacent brewing cartridge 15.

As shown in FIG. 5, the poured-in brewing water W, when poured through the opening 21 from a suitable supply container, such as a decanter D, impinges on the basin bottom wall 30 so as to have some splashing action which may tend to cause portions thereof to splash upwardly through the rearward basin space. The invention comprehends providing a wall member generally designated 52 in overlying relationship to the basin space 29 so as to prevent splashing of a portion of the brewing water outwardly from basin space portion 29 as illustrated in FIG. 5.

As shown in FIG. 4, wall member 52 defines a flat top portion 33, triangular side portions 34, turned side securing portions 35, and a rearwardly depending apron portion 36. The turned securing portions 35 embrace the flange 27 of the basin so as to secure the wall member 52 to the basin with the top wall portion 33 thereof overlying the basin rear portion 29 and underlying the top wall opening 23.

As further illustrated in FIG. 5, liquid which may inadvertently pass down through warmer station opening 23, such as may inadvertently splash from the water delivered from decanter D, or which may pass downwardly from a decanter D' carried on the warmer station 24, is prevented from flowing into the brewing water in the basin by the wall member 52 which thusly acts as a deflector means for preventing contamination of the brewing water by such liquid. The rearward downward inclination of the top wall portion 33 effected by the triangular sidewall 34 causes such liquid to tend to flow rearwardly and downwardly to pass over the rearward apron 36, as illustrated in FIG. 5. However, the wall member is further in heat transfer association with the water heating device 32 as it is mounted above the heating device 32 and, thus, functions to cause evaporation of such liquid falling onto the wall member portion 33 so as to permit elimination of such liquid where only small leakage of the liquid occurs through the opening 23.

The invention further comprehends that the delivery of the brewing water to the basin may alternatively be effected through a conduit 37 connected to a suitable pressurized source (not shown) and having a delivery end portion 38 provided with a distal downturned end 39 extending through a suitable opening 40 in the wall member portion 33 so as to deliver the pressurized water directly into the basin rear portion 29 through the wall member 52. A suitable annular seal 41 may be provided for sealing the distal end 39 to the wall member portion 33 to avoid passage of liquid from opening 23 downwardly through opening 40 into the basin.

As shown in FIG. 5, the wall member 52 further is disposed so as to prevent splashing of water from the pressurized source conduit outwardly from basin portion 29 so as to provide a similar splash control functioning relative to either the poured-in water flow or the pressurized source water flow as utilized. Further, the wall member 52 serves as means for accurately locating the pressurized source delivery end 39 relative to the basin.

As best seen in FIG. 4, the basin may be supported on a pair of upright supports 42 at opposite sides thereof, each having an outturned top support portion 43 adapted to support the flange 27 of the basin. The supports may be further provided with a tongue 44 adapted to be received in a notch 45 in the basin flange 27 so as to accurately locate the basin in relationship to the subjacent water heating device 32. The turned securing portion 35 of the wall member 52 may embrace not only the flange 27 but also the support portions 43 of the upright supports 42, as shown in FIG. 6, so as to lock the basin to the support without additional securing being required in the assembly.

Figure 6:
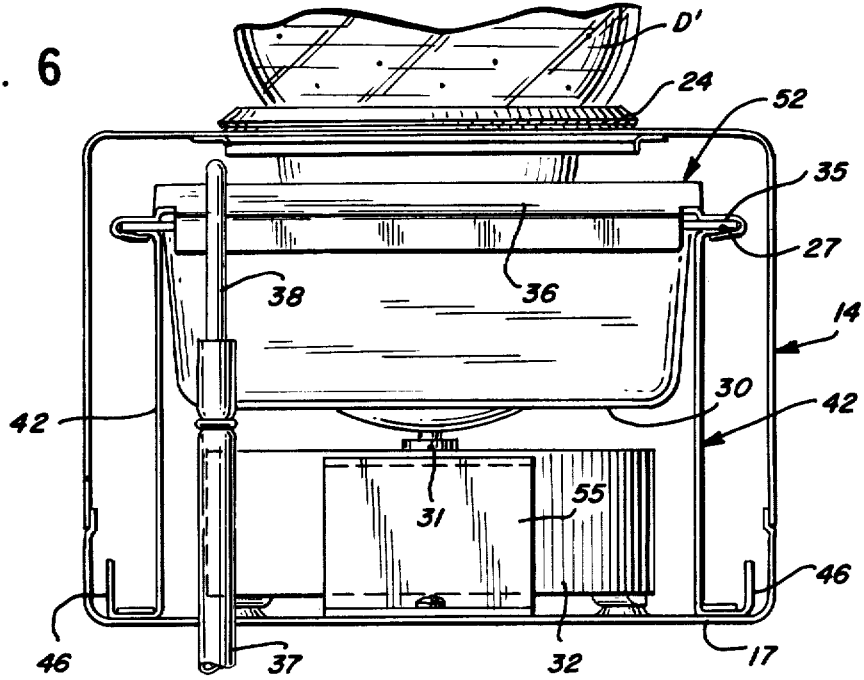
FIG. 6 is a fragmentary transverse vertical section thereof.

As further shown in FIGS. 4 and 6, the supports 42 may be secured to a pair of brackets 46 extending longitudinally fore-and-aft at opposite sides of the shelf 17 of the head portion 14 of cabinet 11. The supports 42 may be secured as by welding to the brackets and are preferably inclined so as to converge toward the basin, thereby providing a resilient biasing support by the supports against the opposite sides of the basin. The brackets may be secured to the upper end 47 of the rear upright support 13 of the housing by suitable screws 48 and the forward ends 49 of the brackets may be secured to the forward portion of the shelf by suitable means, such as welding 50. As further shown in FIG. 5, the water heating device 32 may be mounted to the shelf by suitable screws 51 extending through the shelf 17 and engaging supporting legs 53 of the heating device.

The electrical connections 54 to the heating device 32 may be supported by suitable bracket 55 mounted to the shelf, as seen in FIG. 5. As shown, the controls 54 are disposed subjacent the basin and forwardly of the rear apron 36 so as to avoid dropping of any liquid from the wall member 52 onto the controls.

Thus, the improved beverage brewer structure provides means for effectively preventing liquid from passing downwardly from the warmer station opening into the basin. The same means is utilized to effectively position the water delivery conduit from a pressurized source when utilized. The same means effectively prevents splashing from a rearward portion of the basin with respect to both water poured in from a decanter through the normal pour-in opening of the apparatus or from the pressurized source conduit. Still further, the same means provides means for securing the assembly of the basin, support and protective means together without additional connecting means being required.

The water deflector means is further arranged to be in heat transfer association with the water heating means of the apparatus so as to further define means for dissipating by evaporation liquid which may fall downwardly through the upper warmer station opening thereonto.

The invention, as discussed above, further provides improved means for supporting the basin on the upright rear support of the cabinet through the intermediate use of brackets which further reinforce the shelf portion of the cabinet head and, thus, provide improved facilitated assembly and positive cantilevered support of the head portion of the cabinet. The housing is arranged so that the screws utilized for securing the brackets to the rear upright support portion of the housing also secure the shelf thereto for further facilitated construction and assembly.

The foregoing disclosure of specific embodiments is illustrative of the broad inventive concepts comprehended by the invention.

I claim:

1. In a beverage brewer structure including a water heating device, an upwardly open basin for receiving poured brewing water, said basin being connected to the water heating device for delivering the poured water to the water heating device to be heated therein, a housing having an upper wall overlying a first portion of the basin and provided with a pour-in opening for passing poured water downwardly therethrough into the basin and a warmer station opening overlying a second portion of the basin, and a warmer station mounted to said upper wall to extend across said warmer station opening, the improvement comprising
   wall means disposed subjacent said warmer station opening for preventing liquid which may inadvertently pass downwardly through said warmer station opening from falling into said basin, said wall means being warmed as an incident of operation of the beverage brewer structure whereby evaporation of at least a portion of said liquid may be effected.

2. The beverage brewer structure of claim 1 wherein said wall means comprises a deflector for deflecting such liquid away from said basin.

3. The beverage brewer structure of claim 1 wherein said wall means is heated by heat transfer association with said water heating device.

4. The beverage brewer structure of claim 1 wherein said wall means is inclined downwardly to an edge portion of the basin.

5. In a beverage brewer structure including a water heating device, an upwardly open basin for receiving poured brewing water, said basin being connected to the water heating device for delivering the poured water to the water heating device to be heated therein, a housing having an upper wall overlying a first portion of the basin and provided with a pour-in opening for passing poured water downwardly therethrough into the basin and a warmer station opening overlying a second portion of the basin, and a warmer station mounted to said upper wall to extend across said warmer station opening, the improvement comprising
   wall means disposed superjacent said second portion of the basin for (1) preventing splashing of the poured-in water outwardly from said second portion of the basin and (2) preventing liquid which may inadvertently pass downwardly through said warmer station opening from falling into said basin, said wall means being warmed as an incident of operation of the beverage brewer structure whereby (3) evaporation of at least a portion of said liquid may be effected.

6. The beverage brewer structure of claim 5 wherein said wall means is inclined downwardly away from the space overlying said first portion of the basin.

7. The beverage brewer structure of claim 5 wherein said wall means is inclined downwardly away from the space overlying said first portion of the basin to terminate adjacent an edge portion of the basin.

8. The beverage brewer structure of claim 5 wherein means are provided for securing an edge portion of the wall means to said basin to extend substantially congruently thereto.

9. In a beverage brewer structure including a water heating device, an upwardly open basin for receiving poured brewing water, said basin being connected to the water heating device for delivering the poured water to the water heating device to be heated therein, a delivery conduit having an end portion opening to said basin for alternatively delivering brewing water to said basin from a pressurized water supply, a housing having an upper wall overlying a first portion of the basin and provided with a pour-in opening for passing poured water downwardly therethrough into the basin and a warmer station opening overlying a second portion of the basin, and a warmer station mounted to said upper wall to extend across said warmer station opening, the improvement comprising
   wall means disposed subjacent said warmer station opening for (1) retaining said conduit end portion in position to open into said basin, (2) preventing liquid which may inadvertently pass downwardly through said warmer station opening from falling into said basin and (3) preventing splashing of water delivered by said conduit outwardly from said second portion of the basin.

10. The beverage brewer structure of claim 9 wherein said wall means retains said conduit end portion to open into said second portion of the basin.

11. The beverage brewer structure of claim 9 wherein said wall means comprises a wall member further defining means for preventing splashing of the poured-in water outwardly from said second portion of the basin.

12. In a beverage brewer structure including a water heating device, an upwardly open basin having a first receiving portion for receiving poured brewing water, said basin being connected to the water heating device for delivering the poured water to the water heating device to be heated therein, and a housing having an upper wall overlying the basin and provided with a pour-in opening for passing poured water downwardly therethrough into the basin, the improvement comprising:

a wall member overlying only a second portion of the basin;

means on said basin defining edge portions;

a support carried by said housing and having a connecting portion; and means on said wall member conjointly securing the wall member to the basin edge portion means, and the wall member and basin edge portion means to said support connecting portion to retain said basin receiving portion aligned below said pour-in opening and said wall member disposed laterally thereof.

13. The beverage brewer structure of claim 12 wherein said wall member is positioned by said securing means to prevent splashing of poured-in water outwardly from said second portion of the basin.

14. The beverage brewer structure of claim 12 wherein said wall member is provided with an inlet opening, and said beverage brewer structure includes a delivery conduit for alternatively delivering brewing water to said basin from a pressurized supply, said conduit including a delivery end portion opening downwardly through said wall member inlet opening to deliver the pressurized water to said second portion of the basin, said wall member defining means for preventing splashing of the delivered pressurized water from said second portion of the basin.

15. The beverage brewer structure of claim 12 wherein said wall member is provided with an inlet opening, and said beverage brewer structure includes a delivery conduit for alternatively delivering brewing water to said basin from a pressurized supply, said conduit including a delivery end portion opening downwardly through said wall member inlet opening to deliver the pressurized water to said second portion of the basin, said wall member defining means for preventing splashing of the delivered pressurized water from said second portion of the basin, said beverage brewer structure further including means on said wall member for releasably maintaining said conduit delivery end portion aligned with said inlet opening.

16. The beverage brewer structure of claim 12 wherein said wall member is provided with an inlet opening, and said beverage brewer structure includes a delivery conduit for alternatively delivering brewing water to said basin from a pressurized supply, said conduit including a delivery end portion opening downwardly through said wall member inlet opening to deliver the pressurized water to said second portion of the basin, said wall member defining means for preventing splashing of the delivered pressurized water from said second portion of the basin, said beverage brewer structure further including means on said wall member for releasably maintaining said conduit delivery end portion extending downwardly through said inlet opening.

17. The beverage brewer structure of claim 12 wherein said support comprises a resilient upright resiliently releasably engaging opposite portions of said edge portion means.

18. The beverage brewer structure of claim 12 wherein cooperating locating means are provided on said basin edge portion and said support for locating the basin accurately in preselected overlying relationship to said water heating device.

19. In a beverage brewer structure including a water heating device, an upwardly open basin for receiving poured brewing water, said basin being connected to the water heating device for delivering the poured water to the water heating device to be heated therein, and a housing having an upper wall overlying the basin and provided with a pour-in opening for passing poured water downwardly therethrough into the basin, said housing further including a base and an upstanding post portion having an upper end, the improvement comprising:

a shelf member;

bracket means secured to said shelf member;

means securing the bracket means to said post portion upper end;

a support having means for supporting said basin below said housing upper wall;

means for securing said support to said bracket means; and a cover partially covering said basin and having means for securing said basin to said support means.

20. The beverage brewer structure of claim 19 wherein said shelf member defines a rear end portion and said means securing the bracket means to the post portion upper end is arranged to position said shelf member rear end portion in overlying relationship to said post portion upper end.

21. The beverage brewer structure of claim 19 wherein said shelf member defines a rear end portion and said means securing the bracket means to the post portion upper end is arranged to position said shelf member rear end portion is overlying relationship to said post portion upper end, said shelf member further defining a front end portion, and means are provided for rigidly securing said first end portion to said bracket means.

22. The beverage brewer structure of claim 19 wherein said shelf member defines a rear end portion and said means securing the bracket means to the post portion upper end is arranged to position said shelf member rear end portion in overlying relationship to said post portion upper end, said shelf member further defining a front end portion, and means are provided for rigidly securing said first end portion to said bracket means, said support being secured to said bracket means intermediate said shelf rear and front end portions.

* * * * *